(12) United States Patent
Monkelbaan

(10) Patent No.: US 8,205,863 B2
(45) Date of Patent: Jun. 26, 2012

(54) DISTRIBUTOR FOR A GAS-LIQUID CONTACTING VESSEL

(75) Inventor: Daniel R. Monkelbaan, Amherst, NY (US)

(73) Assignee: UOP LLC, Des Plaines, IL (US)

( * ) Notice: Subject to any disclaimer, the term of this patent is extended or adjusted under 35 U.S.C. 154(b) by 869 days.

(21) Appl. No.: 12/132,362

(22) Filed: Jun. 3, 2008

(65) Prior Publication Data

US 2009/0294997 A1    Dec. 3, 2009

(51) Int. Cl.
*B01F 3/04* (2006.01)

(52) U.S. Cl. ............ 261/97; 261/98; 261/113; 422/275; 422/607; 422/608

(58) Field of Classification Search ............ 261/97, 261/98, 113; 422/275, 607, 608
See application file for complete search history.

(56) References Cited

U.S. PATENT DOCUMENTS

| | | | |
|---|---|---|---|
| 4,432,913 A | 2/1984 | Harper et al. | |
| 4,472,325 A | 9/1984 | Robbins | |
| 4,808,350 A | 2/1989 | Robbins et al. | |
| 4,816,191 A | 3/1989 | Berven et al. | |
| 4,836,989 A * | 6/1989 | Aly et al. | 422/605 |
| 5,192,465 A | 3/1993 | Petrich et al. | |
| 5,237,823 A | 8/1993 | Cheung et al. | |
| 5,470,441 A | 11/1995 | Brown | |
| 5,484,578 A * | 1/1996 | Muldowney et al. | 422/220 |
| 5,688,445 A * | 11/1997 | Wrisberg | 261/96 |
| 7,045,103 B2 * | 5/2006 | McDougald et al. | 422/605 |
| 7,112,312 B2 | 9/2006 | Chou | |
| 7,125,004 B2 | 10/2006 | Dollie et al. | |
| 2007/0241467 A1* | 10/2007 | Sevenhuijsen et al. | 261/97 |

FOREIGN PATENT DOCUMENTS

| | | |
|---|---|---|
| EP | 0563900 A1 | 10/1993 |
| JP | 55159805 A | 12/1980 |

* cited by examiner

*Primary Examiner* — Robert J Hill, Jr.
*Assistant Examiner* — Christopher P Jones
(74) *Attorney, Agent, or Firm* — Mark R Willis

(57) ABSTRACT

One exemplary embodiment can be a distributor for a liquid in a gas-liquid contacting vessel. The distributor can include: a first member forming a plurality of apertures permitting a liquid to pass there-through; a first compartment coupled to the first member forming a barrier proximate to a perimeter of a first aperture of the plurality of apertures; and a second compartment coupled to the first member forming a barrier proximate to a perimeter of a second aperture of the plurality of apertures. Generally, the first compartment forms a hole at a first height and the second compartment forms a hole at a second height different from the first height with respect to the first member.

18 Claims, 4 Drawing Sheets

DISTRIBUTOR FOR A GAS-LIQUID CONTACTING VESSEL

FIELD OF THE INVENTION

This invention generally relates to gas-liquid contacting.

DESCRIPTION OF THE RELATED ART

Generally, an apparatus for distributing liquid to provide gas-liquid contacting can be used in vessels, such as an absorber, a stripper, and a distillation column. As an example, such contacting can be done with a liquid solvent to remove hydrogen sulfide or carbon dioxide from a gas stream. Typically, the vessel is a column that includes packing.

Packed columns can involve counter-current or co-current flow of one or more gases and one or more liquids in the column. Some operations use only a single bed of packing while others may use multiple packing beds. Often, a device is mounted above a packing bed and is known as a "distributor".

Generally, the function of the distributors in gas-liquid contact operations is to ensure uniform wetting of the packing material. If the packing is wetted unevenly, a condition may occur that can be referred to as "mal-distribution." As such, the desired transfer of mass and heat between the vapor and liquid phases is not optimal. Accordingly, mal-distribution can result in poor separation of components in the column and can have other detrimental effects, such as material decomposition in processes that utilize temperature-sensitive liquids.

One solution to overcome these shortcomings can be placing a plurality of tubes near respective orifices on a plate, typically circular, of a distributor. The distributor tubes can form an orifice above the surface of the plate. The liquid accumulating on the plate can rise and pass through the orifices of the tubes to ensure proper wetting of the packing material.

Unfortunately, this solution can have several disadvantages. Generally, it is desirable for the distributor to operate at various conditions. The tubes may not facilitate operations at certain conditions, such as when the vessel is operating at low input rates. In addition, to facilitate even flow through the distributor, the plates of the distributor are designed to be installed leveled. Unfortunately, in some instances the plates are installed unleveled. As such, the unleveled plate can cause a mal-distribution in liquid flow. What is more, the distributor tubes installed on the plate are often custom designed and can be expensive. As such, although the tubes can enhance the distribution of flow, such plates having many tubes can be expensive to manufacture. Consequently, it would be beneficial to design a distributor plate that can overcome these shortcomings.

SUMMARY OF THE INVENTION

One exemplary embodiment can be a distributor for a liquid in a gas-liquid contacting vessel. The distributor can include:

a first member forming a plurality of apertures permitting a liquid to pass there-through;

a first compartment coupled to the first member forming a barrier proximate to a perimeter of a first aperture of the plurality of apertures; and a second compartment coupled to the first member forming a barrier proximate to a perimeter of a second aperture of the plurality of apertures.

Generally, the first compartment forms a hole at a first height and the second compartment forms a hole at a second height different from the first height with respect to the first member.

Another exemplary embodiment can be a distributor for a liquid in a gas-liquid contacting vessel. The distributor can include:

a first member forming a plurality of apertures permitting a liquid to pass there-through; and a plurality of compartments.

Typically, each compartment is coupled to the first member forming a barrier proximate to, respectively, a perimeter at least some of the plurality of apertures, and each compartment forms a hole at approximately a first height. Moreover, the other apertures of the plurality of apertures can have no compartments proximate to their perimeter and are intermingled with the plurality of compartments.

Yet another exemplary embodiment can be a process for operating a gas-liquid contacting apparatus. The process can include passing a liquid through a distributor. Generally, the distributor can include:

a first member positioned substantially horizontally and forming a plurality of apertures permitting liquid to pass there-through;

a first set of compartments coupled to the first member and orientated substantially vertically; and a second set of compartments coupled to the first member and orientated substantially vertically.

Generally, each compartment of the first set can form a barrier around a perimeter of a respective aperture and form a hole at least approximate to a first height. Moreover, each compartment of the second set may form a barrier around a perimeter of a respective aperture and can form a hole at least approximate to a second height. Generally, the first height differs from the second height with respect to the first member and the first set is intermingled with the second set.

DEFINITIONS

As used herein, the term "gas-liquid contacting" generally means the interaction of one or more gases and one or more liquids. The term "gas" can include a vapor.

As used herein, the term "perimeter" generally means a boundary of an object, region, or void, and can be of any suitable size or shape, such as a circle, oval, square, diamond, rectangle, or irregular.

As used herein, the term "fluid" generally includes one or more gases and/or one or more liquids optionally in a solution or a suspension, e.g., vapor. In addition, the term "liquid" can also include solutions and suspensions thereof, including at least one liquid and/or at least one solid in a liquid.

As used herein, the term "set" generally refers to a group of compartments having a hole at substantially the same elevation, although the shape of the compartment and/or hole can be different for compartments within a set.

As used herein, term "aperture" generally refers to an opening in a member for allowing a liquid to pass there-through to facilitate gas-liquid contacting. A plurality of apertures may have the same or different shape and/or size. An aperture may or may not have a compartment proximate to its perimeter creating a barrier.

As used herein, term "cavity" generally refers to an opening in a member for allowing a liquid to pass there-through to facilitate drainage of liquid from a member during, e.g., shut-down of an apparatus containing the member. Although a cavity may be any shape or size, typically the cavity is a smaller dimension than an aperture and may be grouped in a uniform pattern, such as a straight line across a middle of a member.

As used herein, the term "barrier" generally refers to one or more substantially vertical walls that can block the substantially horizontal movement of one or more liquids across the surface of a horizontally orientated member.

As used herein, the term "coupled" can mean two items, directly or indirectly, joined, fastened, associated, connected, or formed integrally together either by chemical or mechanical means, by processes including stamping, molding, or welding. What is more, two items can be coupled by the use of a third component such as a mechanical fastener, e.g. a screw, a nail, a staple, or a rivet; an adhesive; or a solder.

DETAILED DESCRIPTION

Figure 1:
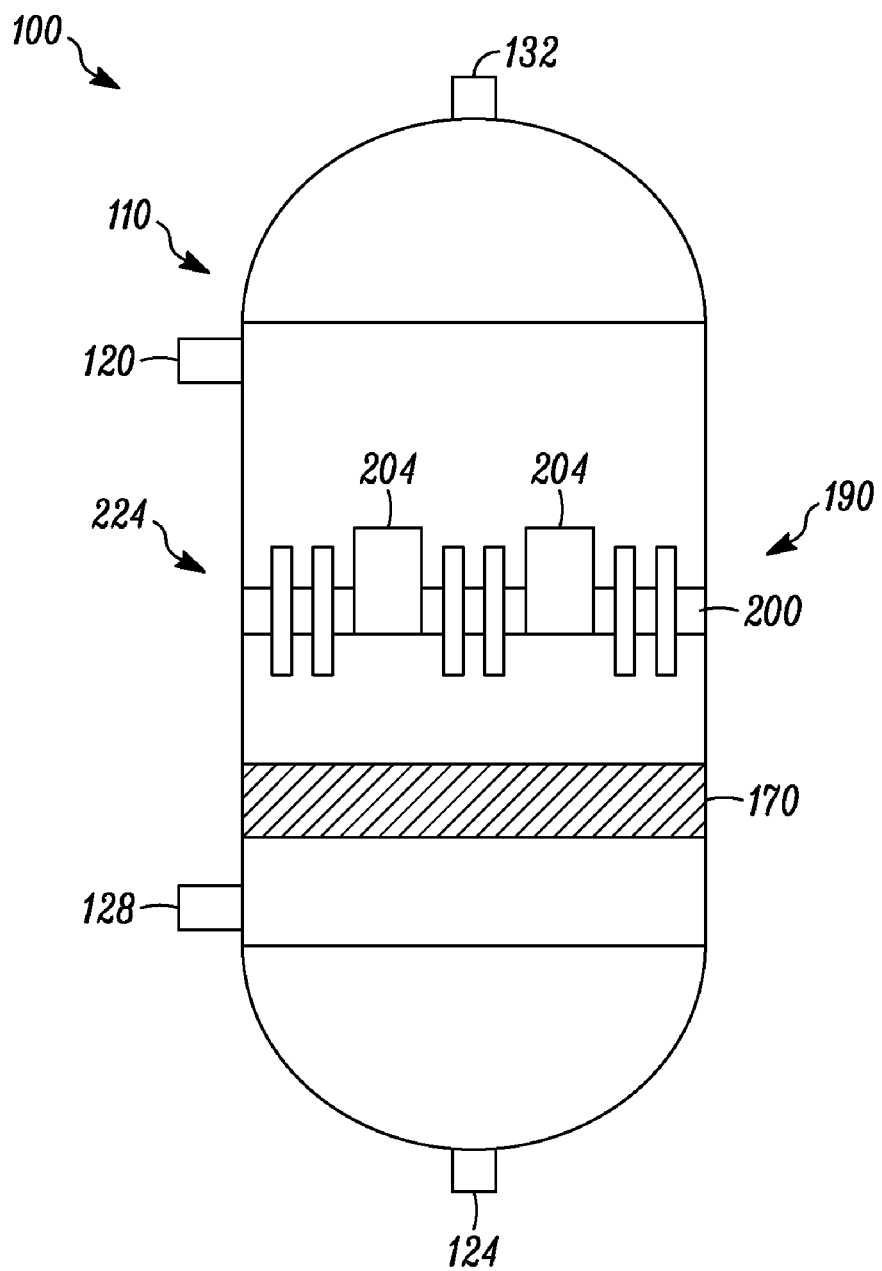
FIG. 1 is a cross-section, elevational view of an exemplary apparatus for gas-liquid contacting.
Figure 2:
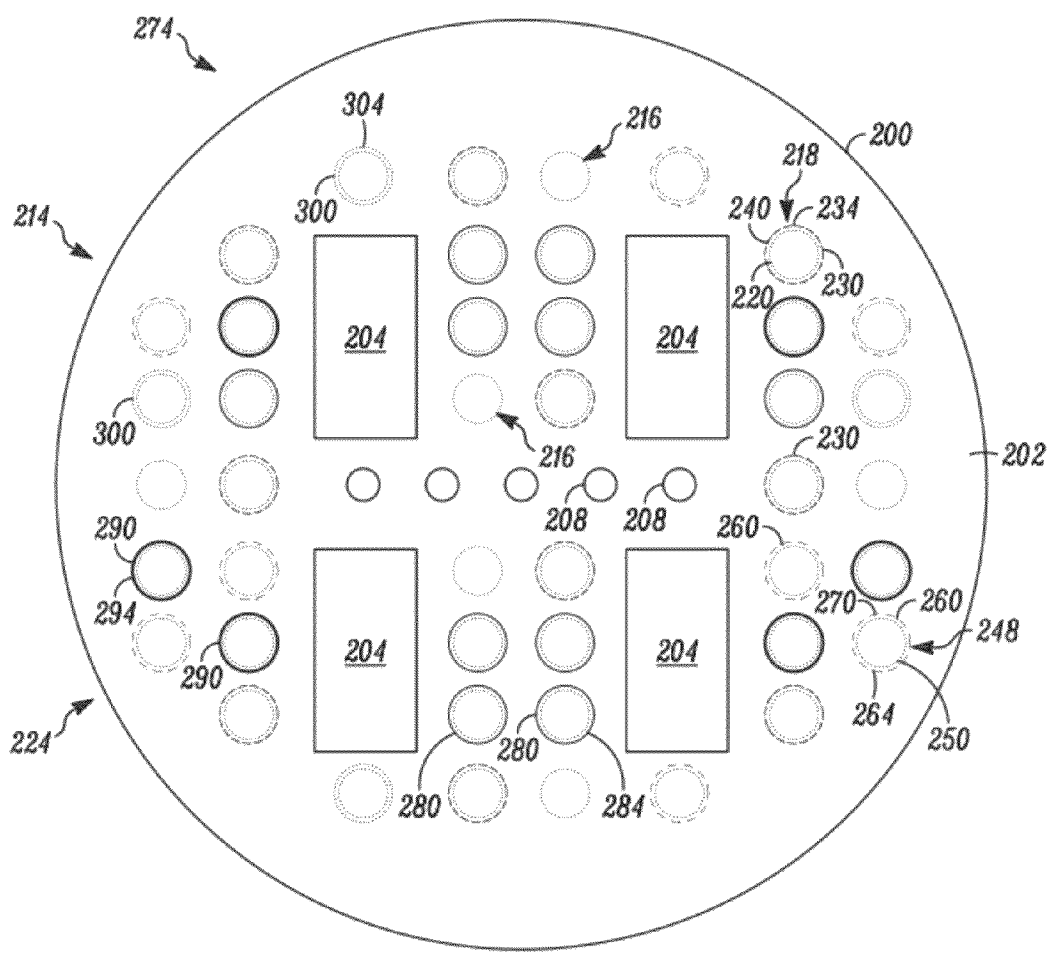
FIG. 2 is a top, plan view of an exemplary first member of an apparatus for gas-liquid contacting.
Figure 3:
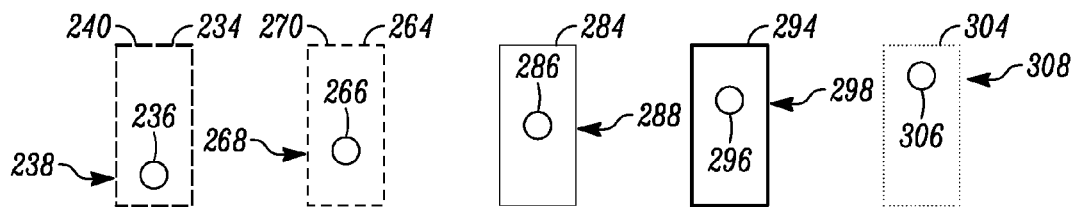
FIG. 3 is a side, elevational view of different compartments.

Referring to FIGS. 1-3, an exemplary apparatus 100 for gas-liquid contacting is depicted. In this exemplary embodiment, the apparatus 100 can be a packed column 110 and be used for any suitable mass and/or heat transfer operation, but the apparatus 100 can in other exemplary embodiments be a distillation column, an absorber, or a stripper. The packed column 110 or vessel 110 can include a liquid inlet 120, a liquid outlet 124, a gas inlet 128, and a gas outlet 132. The gas and liquid fluids in this exemplary embodiment can be in counter-current flow although in other vessels the flow may be co-current. Generally, the packed column 110 also includes a packed bed of particles 170 positioned below a distributor 190. These packing materials are generally commercially available and include Raschig rings, Pall rings, saddles and structural packings having any suitable dimension, e.g., about 1- about 6 cm. Typically, these packing materials are made of a substantially inert material, such as, a stainless steel and/or a ceramic composition, which can be chemically resistant to the fluids passing thereby. Packed columns can be used in various operations, such as distillation, fractionation, absorption, stripping and heat exchange. Exemplary packed columns are disclosed in U.S. Pat. Nos. 4,472,325 and 5,470,441. Although FIG. 1 depicts a packed column, it should be understood that the distributor 190 could be used in other devices such as a distillation column or other gas-liquid contacting vessels. Moreover, although one distributor 190 is depicted, it should be understood that the column 110 can include a plurality of distributors.

The distributor 190 can include a first member 200, a plurality of risers 204 for one or more gases rising and a plurality of compartments 224 for liquid flowing downward in the column 110. Typically, each compartment of the plurality 224 extends below the first member 200. Although a plate distributor is depicted, it should be understood that a trough distributor is also contemplated. Trough distributors typically include a plurality of prism-shaped troughs arranged in a parallel relation. Triangular or rectangular-shaped weirs may be cut into the sides of the troughs and/or orifices may be spaced along the bottom of the trough. A liquid can flow through a side of the trough and/or pass through the bottom to the packing below. In other exemplary embodiments, the plurality of compartments 224 can be placed within the troughs, on one or more of the trough walls, and/or intermingled with the troughs.

As depicted in FIG. 2, the first member 200 is typically circular in shape in a cylindrically-shaped vessel, and may be referred to as a plate. However, the first member or first plate 200 can be of any suitable shape depending on the dimensions of the vessel 110. The first member 200 can include a first surface 202 and form a plurality of drain cavities 208 and a plurality of apertures 214. The plurality of drain cavities 208 can be of any number, shape or size and are typically for draining liquid from the first member 200 to shutdown an apparatus for, e.g., maintenance. The plurality of apertures 214 can be, independently, same or different size and/or shape, and any number may be used for facilitating gas-liquid contacting. The plurality of drain cavities 208 can be same or different shape and/or size as the plurality of apertures 214. Often, the drain cavities 208 have a smaller size than the apertures 214.

Generally, the first member 200 is coupled to the plurality of risers 204 and the plurality of compartments 224. Some of the plurality of apertures 214 can be surrounded by compartments forming barriers to prevent a substantially horizontal liquid flow to the respective aperture while other apertures 216 of the plurality of apertures have no compartments. As depicted in FIG. 2, the apertures 216 have no barriers, e.g., compartments, proximate to their respective perimeters. Thus, a liquid flowing substantially horizontally across the surface 202 of the first member 200 can pass downward there-through.

Any number of drain cavities 208 and apertures 214 may be used. In one exemplary embodiment, the first member 200 can form about 1- about 2 drain cavities 208 and at least about 50, preferably about 100- about 120, apertures 214 per meter squared. However, both the cavities 208 and apertures 214 can be considered pour points through the first member 200. Typically, the drain cavities 208 constitute less than about 5%, preferably no more than about 10%, of the pour points through the first member 200.

The plurality of compartments 224 can include a first set of first compartments 230, a second set of second compartments 260, a third set of third compartments 280, a fourth set of compartments 290, and a fifth set of compartments 300. At least two compartments of each set in this exemplary embodiment as depicted in FIG. 2 are numbered (other compartments of each set as well as some apertures are not numbered to avoid cluttering the drawing with numerals), but it should be understood that each set can include two or more compartments. Typically, about 2- about 12, preferably about 10- about 12, compartments are included in a set, but any number of compartments can be included within a set. Each set of compartments are different from other sets as discussed further below. The individual compartments of different sets as well as apertures can be intermingled 274 with each other as depicted in FIG. 2, although any suitable pattern may be used depending on the desired operations of the vessel 110. Moreover, five sets of compartments are depicted, but any number of sets may be utilized. Each compartment, independently, can have an open- or a close-top. In this exemplary embodiment, all of the plurality of compartments 224 are open-top.

As depicted in FIGS. 2-3, the first set of the first compartments 230 can include a first compartment 234 forming a hole 236 at a first height 238. The first compartment 234 can form a barrier 240 proximate to a perimeter 220 of an aperture 218 of the plurality 214 in the member 200. The second set of compartments 260 can include a second compartment 264 forming a hole 266 at a second height 268. The second compartment 264 can form a barrier 270 proximate to a perimeter 250 of an aperture 248 of the plurality 214 in the member 200. The third set of compartments 280 can include a third compartment 284 forming a hole 286 at a third height 288. The fourth set of compartments 290 can include a fourth compartment 294 forming a hole 296 at a fourth height 298. The fifth set of compartments 300 can include a fifth compartment 304 forming a hole 306 at a fifth height 308. Generally, all compartments can form a barrier to liquid flow and surround a respective aperture of the plurality of apertures 214 formed by the first member 200. Typically, the liquid builds on the first member 200 until it enters the hole formed in the compartment to pass downward through the member 200. In this exemplary embodiment, the compartments 234, 264, 284, 294, and 304 can be tubular in shape, may be referred to as "drip tubes", and be representative of compartments in the respective set. The compartments of each set can form, independently, holes of different shapes and/or sizes, and the compartments of each set can be, independently, different shapes and/or sizes. Generally, compartments of each set are grouped based on the elevation of the bottom edge of the hole. Thus, different compartments within a set can have, independently, different shapes and/or sizes, as well as holes of, independently, different shapes and/or sizes. Also, the shape and/or size of the holes and/or compartments can vary between sets.

Figure 4:
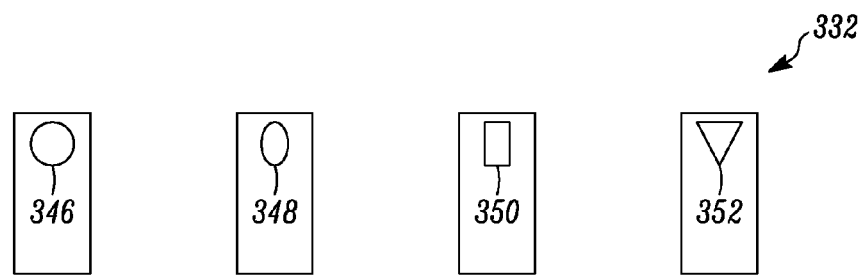
FIG. 4 is a side, elevational view of four compartments.

As an example referring to FIG. 4, another plurality of compartments 332 are depicted each forming different types of holes. As depicted, the compartments can form, respectively, a circular shape hole 346, an oval shape hole 348, a rectangular shape 350, and a triangular shape 352. Although these four specific shapes have been depicted, it should be understood that any shape of hole can be formed in the compartment.

Figure 5:
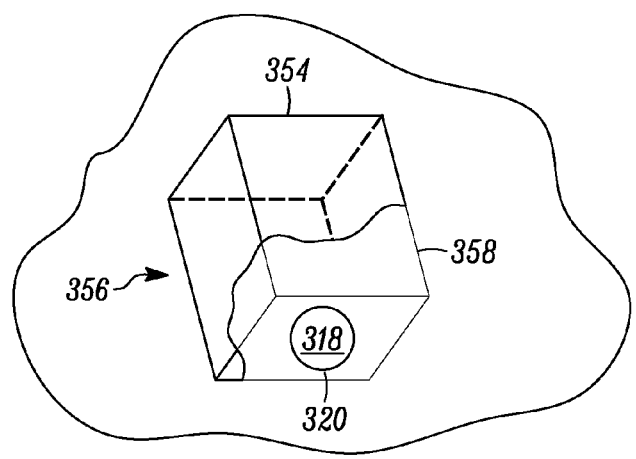
FIG. 5 is a cut-away, perspective view of an exemplary compartment having a prism shape.

As a further example referring to FIG. 5, another exemplary embodiment of a compartment 354 is depicted. In this exemplary embodiment, the compartment 354 is the shape of a prism 356. As depicted, the prism 356 can form a barrier 358 around an exemplary aperture 318 having a perimeter 320.

Figure 6:
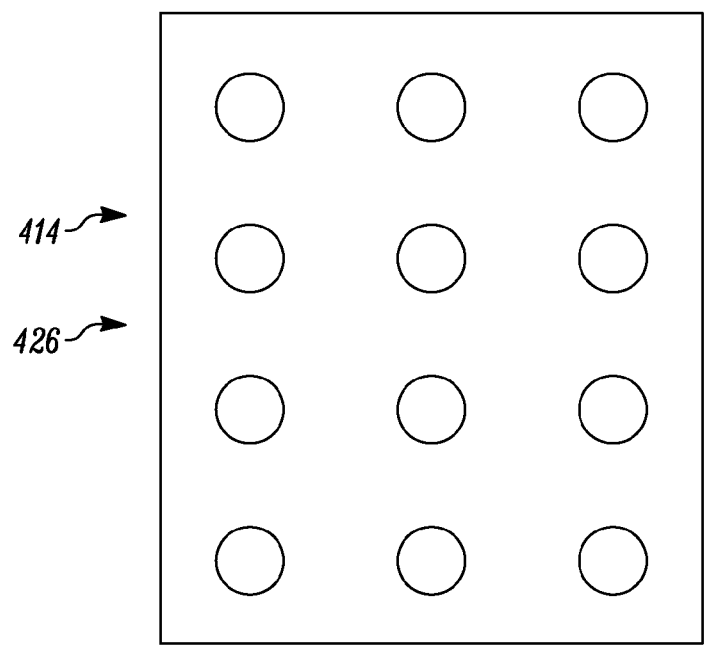
FIG. 6 is a top, plan view of an exemplary square pitch pattern.
Figure 7:
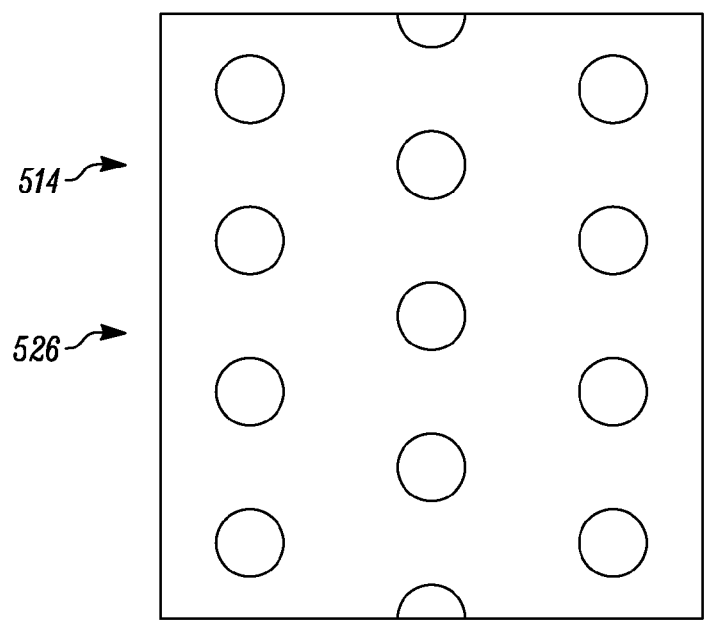
FIG. 7 is a top, plan view of another exemplary pitch pattern.

Referring to FIGS. 6 and 7, other pluralities of apertures are depicted in different patterns. Particularly, FIG. 6 depicts another plurality of apertures 414 having a square pitch pattern 426 while FIG. 7 depicts yet another plurality of apertures 514 having a triangular pitch pattern 526. It should be understood that either of these patterns can be utilized on the distributor 190 and various compartments having various shapes, hole elevations, and hole shapes can be utilized with these patterns depending on the desired vessel operations. Particularly, the compartments and the apertures can be intermingled or set apart in rows, columns or whatever pattern is desired.

Particularly, using a given number of apertures surrounded or not surrounded by compartments may allow the distributor 190 to operate at varying operating conditions. Particularly, it is standard for the distributor to have at least a minimum liquid head, typically at least 50 mm, at reduced operating conditions. Having a variety of compartments with holes at differing elevations and apertures with no compartments permits flexibility in operations.

In addition, the use of a combination of apertures with and without compartments reduces the amount of compartments that can be required. In some exemplary embodiments, the apertures can be the primary mechanism for permitting downward fluid flow utilized with a reduced number of compartments. Reducing the number of compartments can reduce costs of manufacturing the distributor. As an example, about 80% of the apertures numbering about 100- about 120 per meter squared can have no compartment proximate to their respective perimeter, while the remaining about 20% can have compartments forming holes at different elevations.

Moreover, having varying patterns of apertures with and without compartments of different sets can offset deficiencies in positioning the first member in the apparatus. Particularly, if the first member is placed unleveled in the apparatus, the varying heights of the apertures and holes can still ensure sufficient flow to the packed bed below while maintaining a minimum liquid head. As a consequence, this variety of elevations of the apertures in combination with the compartment holes can allow flexibility in installing the member or plate in a vessel.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A distributor for a liquid in a gas-liquid contacting vessel, comprising: a first member forming a plurality of apertures permitting a liquid to pass there-through; a first compartment coupled to the first member forming a barrier proximate to a perimeter of a first aperture of the plurality of apertures, wherein the first compartment forms a hole at a first height; a second compartment coupled to the first member forming a barrier proximate to a perimeter of a second aperture of the plurality of apertures, wherein the second compartment forms a hole at a second height different from the first height with respect to the first member; and a third aperture of the plurality of apertures that does not include a compartment forming a barrier proximate to a perimeter thereof so that the third aperture is configured to permit liquid to pass therethrough to facilitate gas-liquid contacting during normal operation; wherein the first member is configured for counter-current flow of liquid and gas where the liquid travels generally downward through the plurality of apertures and further comprising a riser coupled to the first member to allow gas to travel generally upward therethrough, the riser having a riser wall having a riser height above the first member that is higher than the first height and the second height and is configured to restrict liquid from entering the riser and interfering with gas traveling upward through the riser during operation.

2. The distributor according to claim 1, wherein the first compartment is comprised in a first set of compartments each forming a hole at approximately the first height, wherein the second compartment is comprised in a second set of compartments each forming a hole at approximately the second height, and wherein the third aperture is comprised in a set of apertures that do not include compartments forming barriers proximate to the perimeter thereof.

3. The distributor according to claim 2, wherein the first set of compartments the second set of compartments, and the set of apertures are intermingled.

4. The distributor according to claim 3, wherein the plurality of apertures form a square pitch pattern on the first member.

5. The distributor according to claim 2, further comprising:
a third set of compartments each surrounding a perimeter of some of the plurality of apertures and forming a hole at least approximate to a third height;
a fourth set of compartments each surrounding a perimeter of others of the plurality of apertures and each forming a hole at least approximate to a fourth height; and
a fifth set of compartments each surrounding a perimeter of yet others of the plurality of apertures and each forming a hole at least approximate to a fifth height.

6. The distributor according to claim 5, wherein the first set, second set, third set, fourth set, fifth set, and the set of apertures are intermingled.

7. The distributor according to claim 2, wherein the set of apertures comprise a majority of the plurality of apertures so that the set of apertures are the primary mechanism for downward fluid flow to reduce the number and expense of compartments.

8. The distributor according to claim 7, wherein at least about 80% of the apertures have no compartments and the remaining apertures have compartments.

9. The distributor according to claim 2, wherein the plurality of apertures includes about 100 to about 120 apertures per meter squared.

10. The distributor according to claim 1, wherein the first member further forms a plurality of drain cavities permitting liquid to pass through the first member.

11. The distributor according to claim 1, wherein each of the first and second compartments have a prism shape.

12. The distributor according to claim 1, wherein the hole of the first compartment has a rectangular shape.

13. The distributor according to claim 1, wherein the hole of the first compartment has a triangular shape.

14. An apparatus for gas-liquid contacting, comprising:
a distributor according to claim 1; and
a packed bed of particles positioned below the distributor.

15. A distributor for a liquid in a gas-liquid contacting vessel, comprising:
a first member forming a plurality of apertures permitting a liquid to pass there-through;
a plurality of compartments; wherein each compartment is coupled to the first member forming a barrier proximate to, respectively, a perimeter at least some of the plurality of apertures, and each compartment forms a hole at approximately a first height; and
another plurality of second compartments wherein each second compartment is coupled to the first member forming a barrier proximate to, respectively, a perimeter of other apertures of the plurality of apertures, and each compartment forms a hole at approximately a second height that is different from the first height;
wherein other apertures of the plurality of apertures have no compartments proximate to their perimeter and the plurality of compartments, the plurality of second compartments, and the other apertures are intermingled with each other, and
wherein the first member is configured for counter-current flow of liquid and gas where the liquid travels generally downward through the plurality of apertures and further comprising a riser coupled to the first member with a riser wall having a riser height above the first member that is higher than the first height and the second height and is configured to restrict liquid from entering the riser and interfering with gas traveling upward through the riser during operation.

16. The distributor according to claim 15, wherein the member comprises a single distributor plate and all of the plurality of apertures are formed in the single distributor plate.

17. The distributor according to claim 15, wherein a majority of the plurality of apertures comprise the other apertures that have no compartments proximate to their perimeter so that the other apertures are the primary mechanism for downward fluid flow to reduce the number and expense of compartments.

18. The distributor according to claim 15, wherein each compartment of the first and second sets of compartments forms a barrier around a single aperture formed in the first member.

* * * * *